US012661954B2

(12) United States Patent
Shrivastava et al.

(10) Patent No.: US 12,661,954 B2
(45) Date of Patent: Jun. 23, 2026

(54) METHOD AND SYSTEM FOR LOW CHARGE DETECTION

(71) Applicant: Ford Global Technologies, LLC, Dearborn, MI (US)

(72) Inventors: Rohan Shrivastava, Livonia, MI (US); James Rollinson, Superior Township, MI (US); Jordan Mazaira, Taylor, MI (US); Shahid Bashir, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 205 days.

(21) Appl. No.: 18/461,794

(22) Filed: Sep. 6, 2023

(65) Prior Publication Data
US 2025/0074155 A1 Mar. 6, 2025

(51) Int. Cl.
B60H 1/32 (2006.01)
B60H 1/00 (2006.01)

(52) U.S. Cl.
CPC ....... B60H 1/3213 (2013.01); B60H 1/00278 (2013.01); B60H 1/3225 (2013.01); B60H 2001/325 (2013.01); B60H 2001/3257 (2013.01); B60H 2001/3272 (2013.01)

(58) Field of Classification Search
CPC .............. B60H 1/3205; B60H 1/00278; B60H 2001/325; B60H 2001/3272; B60H 2001/3263; B60H 2001/3257
See application file for complete search history.

(56) References Cited

U.S. PATENT DOCUMENTS

| | | | | |
|---|---|---|---|---|
| 6,089,034 | A * | 7/2000 | Lake | F25B 13/00 62/204 |
| 8,800,309 | B2 | 8/2014 | Buda et al. | |
| 9,869,499 | B2 * | 1/2018 | Liu | F25B 45/00 |
| 10,335,906 | B2 | 7/2019 | Pham | |
| 2021/0178859 | A1 * | 6/2021 | Bellino | B60H 1/00385 |

FOREIGN PATENT DOCUMENTS

| | | | | |
|---|---|---|---|---|
| DE | 102016209500 A1 * | 12/2016 | | F25B 49/022 |
| JP | 2015212594 A | 11/2015 | | |

* cited by examiner

*Primary Examiner* — Frantz F Jules
*Assistant Examiner* — Martha Tadesse
(74) *Attorney, Agent, or Firm* — McCoy Russell LLP

(57) ABSTRACT

Methods and systems for assessing operation of a cooling system of an electric vehicle are described. In one example, a super heating temperature at an inlet of a compressor may be generated solely via a temperature sensor and a pressure sensor. The super heating temperature may be compared against a threshold super heating temperature to judge whether or not an amount of refrigerant in the cooling system is as expected.

14 Claims, 4 Drawing Sheets

METHOD AND SYSTEM FOR LOW CHARGE DETECTION

FIELD

The present description relates to methods and a system for diagnosing operation of a cooling system of a vehicle. The methods and system may be particularly useful for vehicles that include refrigerant based cooling.

BACKGROUND AND SUMMARY

A vehicle may include a cooling system. The cooling system may cool a passenger cabin and a battery that provides power to propel a vehicle. In particular, the cooling system may include refrigerant and the refrigerant may be used to cool the battery and the passenger cabin. The refrigerant may be compressed and condensed to a liquid before it is expanded in a chiller or an evaporator. The chiller may cool liquid coolant and the liquid coolant may be circulated within the battery, thereby cooling the battery. The evaporator may cool air that is passed over the evaporator and returned to the passenger cabin. Thus, a cooling system may apply refrigerant as a medium to cool a liquid and a gas.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an example, referred to herein as the Detailed Description, when taken alone or with reference to the drawings, where.

DETAILED DESCRIPTION

Figure 1:
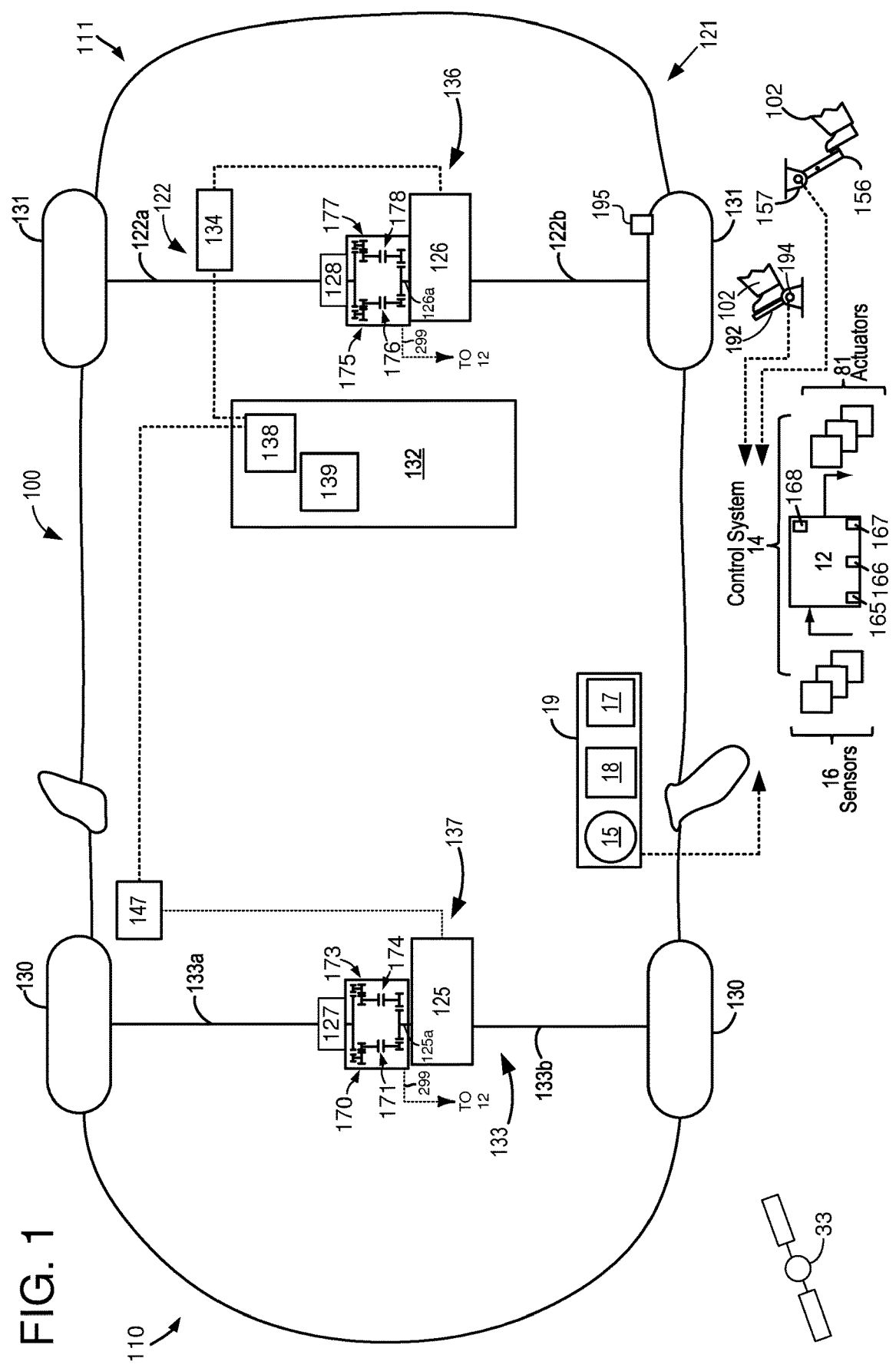
FIG. 1 is a schematic diagram of a non-limiting electric vehicle.
Figure 2:
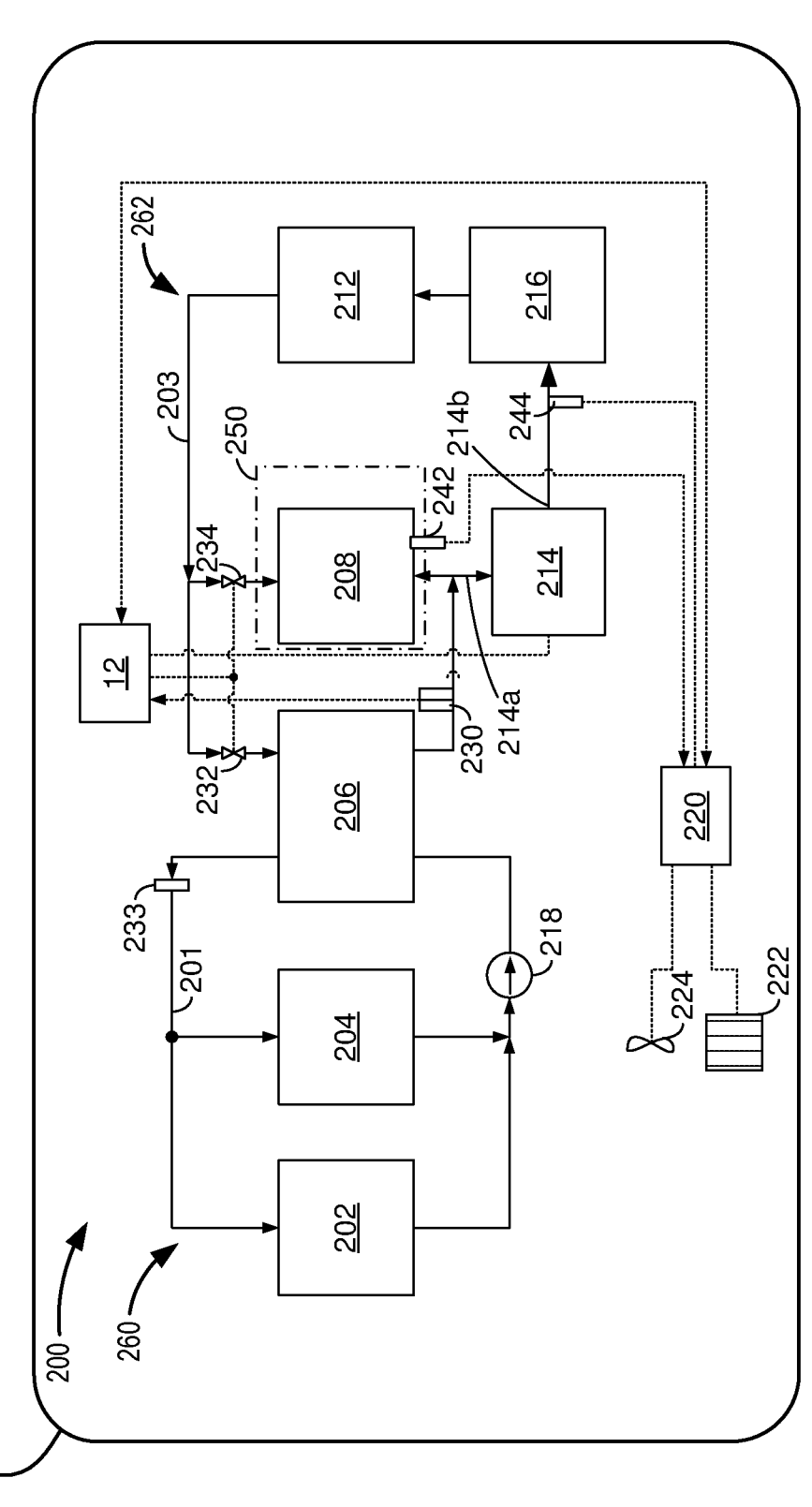
FIG. 2 shows a vehicle cooling system that may cool a battery and a passenger compartment of a vehicle.
Figure 3:
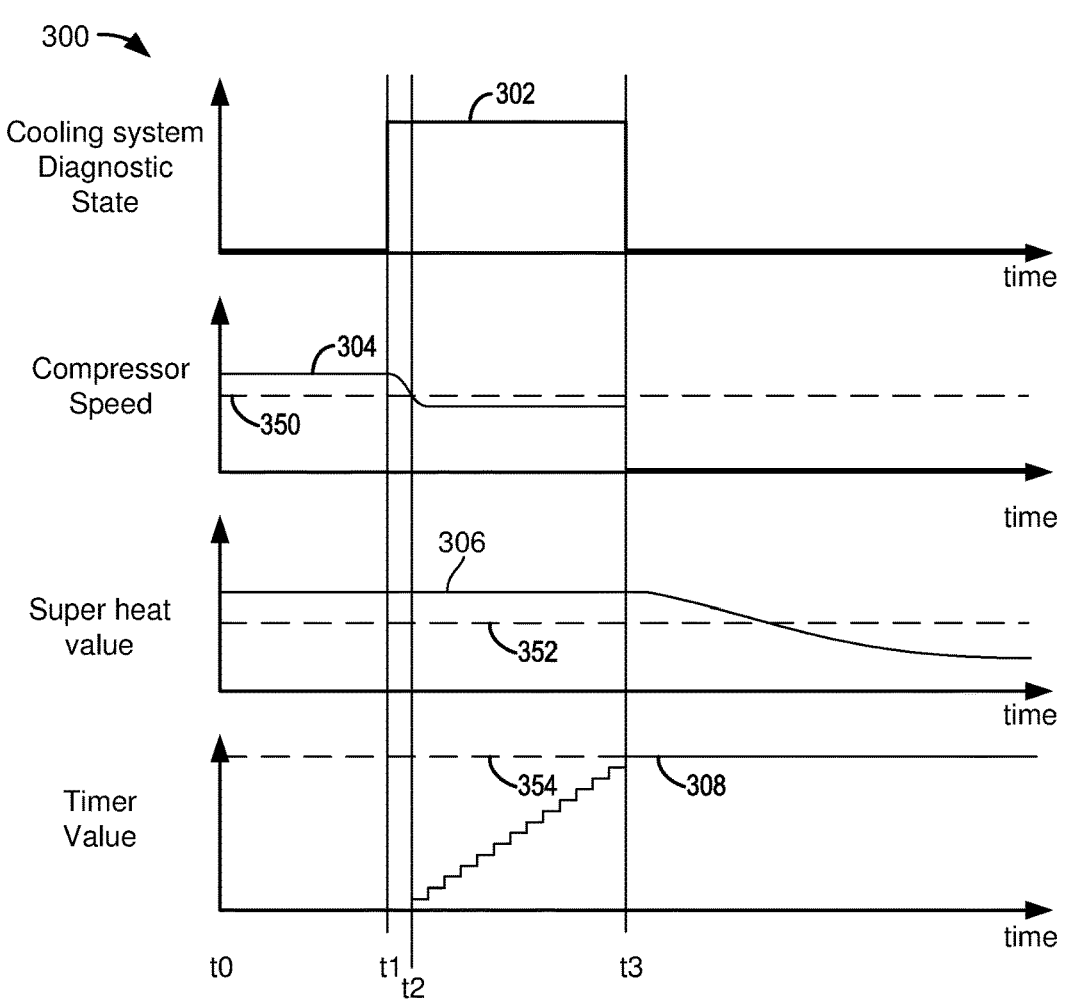
FIG. 3 shows an example operating sequence according to the method of FIG. 4 and the system of FIGS. 1 and 2.
Figure 4:
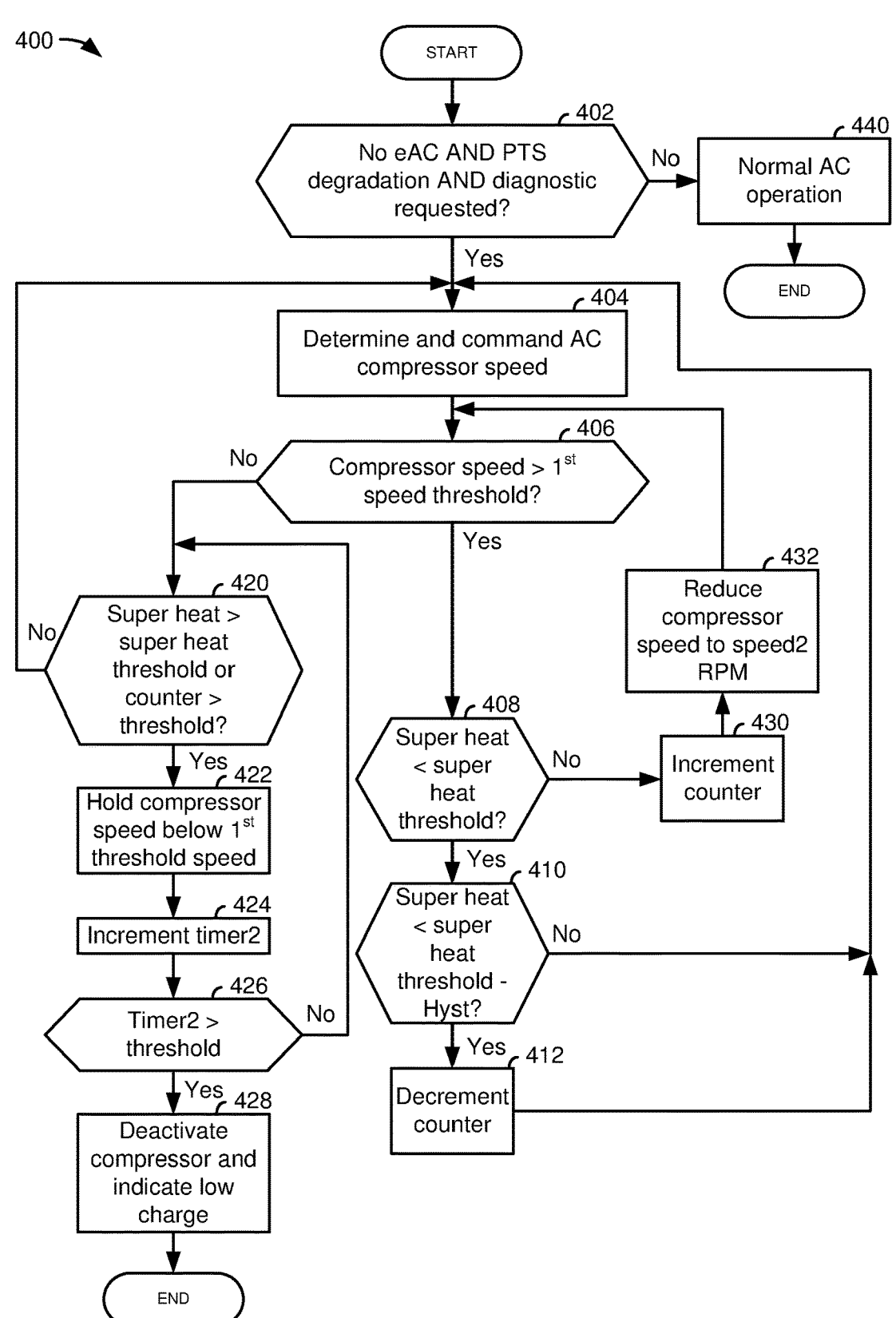
FIG. 4 shows a flowchart of an example method for diagnosing operation of a cooling system of a vehicle.

The present description is related to diagnosing operation of a cooling system of a vehicle. The cooling system may provide cooling to a traction battery and a vehicle passenger cabin or compartment. In one example, the cooling system may include a refrigerant to move heat from a first location to a second location. The cooling system may be part of an electric vehicle as shown in FIG. 1. Alternatively, the cooling system may be part of a hybrid vehicle or of a fuel cell vehicle. The cooling system may be configured as shown in FIG. 2 or in another arrangement. The cooling system may apply refrigerant as a cooling medium. The cooling system may be operated as shown in FIG. 3 to diagnose the cooling system. A method for operating the cooling system is shown in FIG. 4.

A vehicle may include a refrigerant (e.g., R410A) based cooling system to cool passenger areas and components of a vehicle. The cooling system may be configured as a heat pump, which may swap functionality of heat exchangers in the heat pump during varying operating conditions. The vehicle's cooling system may provide cooling to different areas of a vehicle and devices within the vehicle at a same time. For example, the cooling system may cool a traction battery and a passenger compartment of a vehicle at a same time. The cooling system may adjust a speed of a refrigerant compressor or pump and positions of one or more valves (e.g., expansion valves) to provide different levels of cooling capacity to the devices and passenger areas of the vehicle. However, if refrigerant is lost from the cooling system, lubrication of the compressor may be reduced and the compressor may degrade. One way to determine whether or not refrigerant has been lost from the cooling system is to monitor pressure at an inlet side of a compressor and at an outlet side of the compressor. However, measuring refrigerant pressure at an inlet and outlet of a compressor may only be responsive to large losses of refrigerant. Consequently, there may be fewer opportunities to implement corrective measures before more significant mitigation techniques may have to be applied to reduce a possibility of compressor degradation. Therefore, it may be desirable to provide a way of detecting smaller losses of refrigerant from a cooling system.

The inventors herein have recognized the above-mentioned disadvantage and have developed a method for operating a cooling system of a vehicle, comprising: generating an estimate of a super heating temperature of a refrigerant according to a pressure at an inlet side of a compressor and a temperature at the inlet side of the compressor; and deactivating the compressor in response to the estimate of the super heating temperature of the refrigerant exceeding a super heating threshold temperature.

By estimating a super heating temperature at an inlet of a compressor and comparing the super heating temperature against a threshold super heating temperature, it may be possible to determine whether or not a cooling system has lost small or larger amounts of refrigerant so that less significant mitigating actions may be taken before larger mitigating actions are implemented. The less significant mitigating actions may allow cooling of the vehicle to be maintained for a period of time so that a vehicle user may plan to have the vehicle serviced. Further, the mitigating actions may lower the possibility of compressor degradation.

The present description may provide several advantages. Specifically, the approach may reduce a possibility of compressor degradation. Further, the approach may also provide a higher confidence level for detecting refrigerant loss in a cooling system. In addition, the approach may be implemented during cold or warm ambient temperatures and independent of whether a heat pump is operating in a cooling or heating mode.

The above advantages and other advantages, and features of the present description will be readily apparent from the following Detailed Description when taken alone or in connection with the accompanying drawings.

Referring to FIG. 1, a non-limiting example vehicle propulsion system 100 for vehicle 121 is shown. A front portion of vehicle 121 is indicated at 110 and a rear portion of vehicle 121 is indicated at 111. Vehicle propulsion system 100 includes at two propulsion sources including front electric machine 125 and rear electric machine 126. However, in other examples, vehicle 121 may include only one electric machine. Electric machines 125 and 126 may consume or generate electrical power depending on their operating mode. Throughout the description of FIG. 1, mechanical connections between various components are illustrated as solid lines, whereas electrical connections between various components are illustrated as dashed lines.

Vehicle propulsion system 100 includes a front axle 133 and a rear axle 122. In some examples, rear axle may comprise two half shafts, for example first half shaft 122*a*, and second half shaft 122*b*. Likewise, front axle 133 may comprise a first half shaft 133*a* and a second half shaft 133*b*. Vehicle propulsion system 100 further has front wheels 130 and rear wheels 131. In this example, front wheels 130 may be selectively driven via electric machine 125. Rear wheels 131 may be driven via electric machine 126.

The rear axle 122 is coupled to electric machine 126. Rear drive unit 136 may transfer power from electric machine 126 to axle 122 resulting in rotation of drive wheels 131. Rear drive unit 136 may include a low gear set 175 and a high gear 177 that are coupled to electric machine 126 via output shaft 126*a* of rear electric machine 126. Low gear 175 may be engaged via fully closing low gear clutch 176. High gear 178 may be engaged via fully closing high gear clutch 178. High gear clutch 178 and low gear clutch 176 may be opened and closed via commands received by rear drive unit 136 over CAN 299. Alternatively, high gear clutch 178 and low gear clutch 176 may be opened and closed via digital outputs or pulse widths provided via control system 14. Rear drive unit 136 may include differential 128 so that torque may be provided to axle 122*a* and to axle 122*b*. In some examples, an electrically controlled differential clutch (not shown) may be included in rear drive unit 136.

The front axle 133 is coupled to electric machine 125. Front drive unit 137 may transfer power from electric machine 125 to axle 133 resulting in rotation of drive wheels 130. Front drive unit 137 may include a low gear set 170 and a high gear 173 that are coupled to electric machine 125 via output shaft 125*a* of front electric machine 125. Low gear 170 may be engaged via fully closing low gear clutch 171. High gear 173 may be engaged via fully closing high gear clutch 174. High gear clutch 174 and low gear clutch 171 may be opened and closed via commands received by front drive unit 137 over CAN 299. Alternatively, high gear clutch 174 and low gear clutch 171 may be opened and closed via digital outputs or pulse widths provided via control system 14. Front drive unit 137 may include differential 127 so that torque may be provided to axle 133*a* and to axle 133*b*. In some examples, an electrically controlled differential clutch (not shown) may be included in front drive unit 137.

Electric machines 125 and 126 may receive electrical power from onboard electrical energy storage device 132 (e.g., a traction battery or a battery that provides power for propulsive effort of a vehicle). Furthermore, electric machines 125 and 126 may provide a generator function to convert the vehicle's kinetic energy into electrical energy, where the electrical energy may be stored at electric energy storage device 132 for later use by the electric machine 125 and/or electric machine 126. A first inverter system controller (ISC1) 134 may convert alternating current (AC) generated by rear electric machine 126 to direct current (DC) for storage at the electric energy storage device 132 and vice versa. A second inverter system controller (ISC2) 147 may convert alternating current generated by front electric machine 125 to direct current for storage at the electric energy storage device 132 and vice versa. Electric energy storage device 132 may be a battery, capacitor, inductor, or other electric energy storage device.

In some examples, electric energy storage device 132 may be configured to store electrical energy that may be supplied to other electrical loads residing on-board the vehicle (other than the motor), including compartment heating and air conditioning, engine starting, headlights, compartment audio and video systems, etc.

Control system 14 may communicate with one or more of electric machine 125, electric machine 126, energy storage device 132, etc. Control system 14 may receive sensory feedback information from one or more of electric machine 125, electric machine 126, energy storage device 132, etc. Further, control system 14 may send control signals to one or more of electric machine 125, electric machine 126, energy storage device 132, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to a propulsive effort pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Energy storage device 132 may periodically receive electrical energy from a power source such as a stationary power grid (not shown) residing external to the vehicle (e.g., not part of the vehicle). As a non-limiting example, vehicle propulsion system 100 may be configured as a plug-in electric vehicle (EV), whereby electrical energy may be supplied to energy storage device 132 via the power grid (not shown).

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Controller 12 may comprise a portion of a control system 14. In some examples, controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include tire pressure sensor(s) (not shown), wheel speed sensor(s) 195, etc. In some examples, sensors associated with electric machine 125, electric machine 126, wheel speed sensor 195, etc., may communicate information to controller 12, regarding various states of electric machine operation. Controller 12 includes non-transitory memory (e.g., read only memory) 165, random access memory 166, digital inputs/outputs 168, and a microcontroller 167.

Vehicle propulsion system 100 may also include an on-board navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites 33, and from the signal identify the geographical location of the vehicle. In some examples, the geographical location coordinates may be communicated to controller 12. The navigation system may also break a travel route into an actual total number of segments so that vehicle operation in the segments may be predicted. Navigation system 17 may communicate data from the travel route to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., electric machine 125 and electric machine 126) based on an operator input. Various examples of the operator ignition interface 15 may include interfaces that require a physical apparatus, such as an active key, that may be inserted into the operator interface 15 to start the electric machines 125 and 126 and to turn on the vehicle, or may be removed to shut down the electric machines 125 and 126 to turn off the vehicle. Other examples may include a passive key that is communicatively coupled to the operator interface 15. The passive key may be configured as an electronic key fob or a smart key that does not have to be inserted or removed from the interface 15 to operate the vehicle electric machines 125 and 126. Rather, the passive key may need to be located inside or proximate to the vehicle (e.g., within a threshold distance of the vehicle). Still other examples may additionally or optionally use a start/stop button that is manually pressed by the operator to start or shut down the electric machines 125 and 126 to turn the vehicle on or off. In other examples, a remote electric machine start may be initiated remote computing device (not shown), for example a cellular telephone, or smartphone-based system where a user's cellular telephone sends data to a server and the server communicates with the controller 12 to start the engine.

Referring to FIG. 2, a schematic representation of a vehicle 10 with a non-limiting cooling system 200 is shown. Solid line flow direction arrows (e.g., 204) represent conduits and show coolant and refrigerant flow directions in cooling system 200 when cooling system 200 is operated in a cooling mode. The vehicle 10 may have any suitable drivetrain and may include one or more electric machines (e.g., 125 as shown in FIG. 1) that may be used to propel the vehicle 10 and/or power vehicle components. Alternatively, the vehicle may be a hybrid vehicle. The vehicle 10 may include a passenger compartment 250 and a cooling system 200. Devices and fluidic passages or conduits are shown as solid lines in FIG. 2. Electrical connections are shown as dashed lines in FIG. 2.

Cooling system 200 includes a coolant loop 260 where chilled coolant may circulate as indicated by the coolant flow arrows (e.g., 201). Coolant loop 260 includes an electric energy storage device 132, other devices 202 (e.g., power converters, etc.) that may be cooled by coolant that has been cooled via chiller 206 (e.g., gas to liquid heat exchanger), coolant pump 218, chiller 206, and coolant temperature sensor 233. Coolant that has been cooled via chiller may cool electric energy storage device 132 and other devices 202. Coolant pump 218 may circulate coolant in coolant loop 260.

Cooling system 200 also includes a refrigerant loop 262 where refrigerant may circulate as indicated by refrigerant flow arrows (e.g., 203). Refrigerant loop 262 includes chiller 206, evaporator 208, electrically driven compressor 214, integrated temperature and pressure sensors 230, pressure sensor 244, water cooled condenser 216, outside heat exchanger 212, first expansion valve 232, and second expansion valve 234. Refrigerant that has been compressed via electrically driven compressor 214 may be condensed and cooled by water cooled condenser and outside heat exchanger 212 before the refrigerant if expanded at first expansion valve 232 or second expansion valve 234. Expanded refrigerant may cool liquid coolant in chiller 206. Further, expanded refrigerant may cool air in passenger compartment 250 via evaporator 208. Evaporator sensor 242 may provide an indication of a temperature at fins of evaporator 208. Air is cooled via flowing air across the fins.

A controller 12 (e.g., a vehicle system controller) may adjust a speed of electrically driven compressor 214 via controlling electric current flow to the electrically driven compressor 214. Integrated temperature and pressure sensors 230 may provide refrigerant temperatures on inlet side 214a of electrically driven compressor 214 to controller 12. Integrated temperature and pressure sensors 230 are positioned downstream of chiller 206 and upstream of electrically driven compressor 214 according to the direction of refrigerant flow. Pressure sensor 244 may provide an indication of refrigerant pressure on outlet side 214b of electrically driven compressor 214 to second controller 220. Controller 12 may also adjust positions of first expansion valve 232 and second expansion valve 234 via electric power that is controlled via controller 12.

Second controller 220 may adjust a positon of vehicle grill shutters 222 and a speed of cooling fan 224 via electric power that is controlled via second controller 220. For example, second controller 220 may increase an opening amount of vehicle grill shutters 222 and increase a speed of cooling fan 224 as refrigerant pressure increases on the outlet side of electrically driven compressor 214.

The system of FIGS. 1 and 2 provides for a vehicle system, comprising: a cooling system including a compressor, an evaporator, a chiller, an outside heat exchanger, and a water cooled condenser; and a controller including executable instructions stored in non-transitory memory that cause the controller to adjust a speed of the compressor in response to a super heating temperature of a refrigerant being greater than a super heating temperature threshold. In a first example, the vehicle system further comprises additional executable instructions stored in non-transitory memory that cause the controller to estimate the super heating temperature of the refrigerant according to a temperature and pressure of the refrigerant. In a second example that may include the first example, the vehicle system includes where adjusting the speed of the compressor includes adjusting the compressor speed to zero speed. In a third example that may include one or both of the first and second examples, the vehicle system further comprises additional executable instructions stored in non-transitory memory that cause the controller to reduce a speed of the compressor in response to the super heating temperature of the refrigerant being greater than the super heating temperature threshold. In a fourth example that may include one or more of the first through third examples, the vehicle system further comprises additional executable instructions stored in non-transitory memory that cause the controller to count an actual total number of executable instruction loops that have been performed when the super heating temperature is greater than the super heating temperature threshold. In a fifth example that may include one or more of the first through fourth examples, the vehicle system includes where the controller adjusts the speed of the compressor after a predetermined amount of time has elapsed since a most recent time the super heating temperature of the refrigerant changed from being less than the superheating temperature to being greater than or equal to the super heating temperature threshold. In a sixth example that may include one or more of the first through fifth examples, the vehicle system includes where the super heating temperature is based solely on a temperature and a pressure upstream of the compressor and downstream of the chiller.

Referring now to FIG. 3, an example prophetic cooling system operating sequence according to the method of FIG. 4 is shown. The plots of FIG. 3 are time aligned. The sequence of FIG. 3 may be generated via the system of FIGS. 1 and 2 in cooperation with the method of FIG. 4. The vertical lines at times t0-t2 represent times of interest in the plots.

The first plot from the top of FIG. 3 is a plot of cooling system diagnostic state versus time. The vertical axis represents cooling system diagnostic state and the cooling system diagnostic is not active when trace 302 is at a lower level near the horizontal axis. The cooling system diagnostic is active when trace 302 is at a higher level near the vertical axis arrow. The horizontal axis represents time and time increases from the left side of the figure to the right side of the figure. Trace 302 represents the cooling system diagnostic state.

The second plot from the top of FIG. 3 is a plot of compressor speed versus time. The vertical axis represents compressor speed and compressor speed increases in the direction of the vertical axis arrow. The horizontal axis represents time and time increases from the left side of the figure to the right side of the figure. Horizontal line 350 represents a threshold compressor speed. Line 304 represents compressor speed.

The third plot from the top of FIG. 3 is a plot of a super heat temperature value for refrigerant in the cooling system. The super heat temperature value may be expressed as the present refrigerant temperature minus a boiling point temperature of the refrigerant when the refrigerant is in a liquid state. The super heat temperature increases in the direction of the vertical axis arrow. The horizontal axis represents time and time increases from the left side of the figure to the right side of the figure. Horizontal line 352 represents a threshold super heat temperature value. Line 306 represents the super heat temperature value for refrigerant in the cooling system.

The fourth plot from the top of FIG. 3 is a plot of a timer value versus time. The vertical axis represents timer value and the timer value increases in the direction of the vertical axis arrow. The horizontal axis represents time and time increases from the left side of the figure to the right side of the figure. Line 308 represents the timer value. Horizontal line 354 represents a threshold amount of time.

At time t0, the compressor diagnostic is not activated and the compressor speed is above threshold compressor speed 350. The super heat temperature for refrigerant in the cooling system is greater than the super heat temperature threshold and the timer value is zero since the diagnostic has not started and since At time t1, the cooling system diagnostic is activated. The cooling system diagnostic may be activated during predetermined conditions (e.g., the vehicle has been operated for a threshold amount of time, the cooling system has been activated for a threshold amount of time, etc.). Since the compressor speed is greater than the threshold compressor speed and since the super heat temperature of the refrigerant is greater than the super heat temperature threshold, the compressor speed is commanded to a lower speed shortly after time t1. The timer is not activated.

At time t2, the cooling system diagnostic continues to be active and the compressor speed falls below the compressor threshold speed. This causes the timer to begin to accumulate time. The super heat temperature remains above the threshold super heat temperature even though the compressor speed has been reduced. This may indicate that there may be less refrigerant in the cooling system than may be expected and/or desired.

At time t3, the timer value exceeds the timer threshold value, but the super heat temperature is still above the super heat temperature threshold, which may be indicative of a low refrigerant (charge) level. Therefore, the diagnostic is ended. In this example, the compressor speed is reduced to zero speed to reduce a possibility of compressor degradation. Additionally, other mitigating actions may be taken in response to the super heat temperature value being greater than the super heat temperature threshold. The timer ceases counting and the super heat value begins to be reduced after the compressor speed is reduced.

In this way, a diagnostic may determine whether or not a cooling system may be degraded. In particular, a super heat temperature that is greater than a threshold temperature may be indicative of less refrigerant in the refrigerant loop than may be desired. If a low level of refrigerant is detected, the electrically operated compressor may be deactivated to reduce a possibility of degrading the electrically operated compressor.

Referring now to FIG. 4, a method for operating a cooling system of a vehicle is shown. The method of FIG. 4 may be included in the system of FIGS. 1 and 2 as executable instructions stored in non-transitory memory. Further still, portions of the method of FIG. 4 may be actions taken in the physical world by a controller.

At 402, method 400 judges whether or not there is no indication of existing cooling system degradation (e.g., no electric air conditioning (eAC) degradation) and no pressure sensor and temperature sensor (PTS) degradation. If there is no cooling system degradation and no pressure and temperature sensor degradation, the answer is yes and method 400 proceeds to Method 400 proceeds to 404. Otherwise, the answer is no and method 400 proceeds to 440. The timer and counter values mentioned below may be reset to zero upon entry into the diagnostic or after the diagnostic is complete.

At 440, method 400 operates the air conditioning (AC) system or heat pump according to base or normal operation. For example, method 400 may adjust compressor speed according to cooling load and irrespective of the super heating temperature of the refrigerant. Method 400 proceeds to exit.

At 404, method 400 determines the commanded speed for the AC compressor. In one example, method 400 may commands and adjusts the speed of the AC compressor according to a difference between a requested passenger cabin temperature and an actual or measured passenger cabin temperature. Further, the compressor speed may also be commanded and adjusted according to a difference between a requested traction battery temperature and an actual traction battery temperature. Method 400 proceeds to 406 after the electrically driven compressor speed is commanded and adjusted according to a base electrically driven compressor speed control routine.

At 406, method 400 judges whether or not the speed of the electrically driven compressor is greater than a first threshold speed for the electrically driven compressor. In one example, the first threshold speed for the electrically driven compressor is based on empirically determined data collected while varying ambient temperature, compressor speed, refrigerant charge amount, etc., If method 400 judges that the present speed of the electrically driven compressor is greater than the first compressor speed threshold, the answer is yes and method 400 proceeds to 408. Otherwise, the answer is no and method 400 proceeds to 420.

At 408, method 400 judges whether or not the super heat temperature of the refrigerant is less than a first super heat temperature threshold. If so, the answer is yes and method 400 proceeds to 410. Otherwise, the answer is no and method 400 proceeds to 430. In one example, the super heat temperature of the refrigerant may be determined via the following equation:

$$\text{Superheat} = f(compintemp, compinpress) - refboiltmp$$

where superheat is the estimated super heat temperature of the refrigerant, f is a function that returns a temperature based on empirically determined values of electrically driven compressor inlet temperature and electrically driven compressor inlet pressure and refboiltmp is the refrigerant's boiling temperature from a liquid phase to a gas phase. By considering both the refrigerant temperature at the compressor inlet and the refrigerant pressure at the compressor inlet, the super heat temperature estimate may be improved. The first super heat temperature threshold is based on empirically determined data collected when refrigerant amount is varied, compressor speed is varied, and ambient air temperature varies.

At 410, method 400 judges whether or not the super heat temperature of the refrigerant is less than a first super heat temperature threshold minus a hysteresis temperature Hyst. If so, the answer is yes method 400 proceeds to 412. Otherwise, the answer is no and method 400 returns to 404.

At 412, method 400 decrements a counter and returns to 404. The counter may be included as instructions that are stored in non-transitory memory and the counter is used as a basis for reducing a possibility of compressor degradation. The threshold counter value at 420 may be selected to reduce influence of noise factors in the system and to lower risk of system degradation. Method 400 returns to 404.

At 430, method 400 increments the counter and proceeds to 432. At 432, method 400 reduces a speed of the compressor to a predetermined speed (speed2). The predetermined speed may be a compressor speed that causes an expected super heat temperature if the amount of refrigerant in the cooling system is greater than a threshold amount (e.g., sufficient to no be considered a low level). Method 400 returns to 406.

At 420, method 400 method 400 judges whether or not the super heat temperature of the refrigerant is greater than a second super heat temperature threshold. If so, the answer is yes and method 400 proceeds to 422. Otherwise, the answer is no and method 400 returns to 404.

At 422, method 400 maintains the speed of the electrically driven compressor to be less than the first threshold speed. Method 400 proceeds to 424.

At 424, method 400 increments a timer (timer2) and allows a cumulative time to increase. Method 400 proceeds to 426.

At 426, method 400 judges whether or not the value of timer (timer2) is greater than a threshold amount of time. If so, the answer is yes and method 400 proceeds to 468. Otherwise, the answer is no and method 400 returns to 420.

At 428, method 400 may indicate that refrigerant (charge) is low and method 400 may perform mitigating actions. The indication of low charge may be displayed via a human/machine interface. The mitigating actions may include, but are not limited to adjusting electrically driven compressor speed to zero (deactivate the compressor), reducing loads on the cooling system such as closing off one or more expansion valves and limiting vehicle torque to reduce loading on the chiller, etc. Method 400 proceeds to exit.

In this way, method 400 may detect low refrigerant levels without using temperature and/or pressure upstream of a compressor in a refrigerant loop. Further, method 400 may take mitigating actions if a low refrigerant level is detected so that the possibility of compressor degradation may be reduced.

The method of FIG. 4 provides for a method for operating a cooling system of a vehicle, comprising: generating an estimate of a super heating temperature of a refrigerant according to a pressure at an inlet side of a compressor and a temperature at the inlet side of the compressor; and deactivating the compressor in response to the estimate of the super heating temperature of the refrigerant exceeding a super heating threshold temperature. In a first example, the method may include where the compressor is deactivated when the estimate of the super heating temperature of the refrigerant exceeds the super heating threshold temperature for a predetermined amount of time. In a second example that may include the first example, the method includes where the super heating threshold temperature is based on ambient temperature and a speed of the compressor. In a third example that may include one or both of the first and second examples, the method includes where the super heating temperature is a present temperature of the refrigerant minus a boiling temperature of the refrigerant in a liquid state. In a fourth example that may include one or more of the first through third examples, the method includes where the estimate of the super heating temperature is determined without a pressure downstream of the compressor and upstream of an expansion valve. In a fifth example that may include one or more of the first through fourth examples, the method includes where the temperature and pressure are downstream of a chiller and upstream of the compressor. In a sixth example that may include one or more of the first through fifth examples, the method further comprises commanding the compressor to a speed based on a temperature difference. In a seventh example that may include one or more of the first through sixth examples, the method includes where the temperature difference is a difference between a requested passenger cabin temperature and measured passenger cabin temperature.

The method of FIG. 4 also provides for a method for operating a cooling system of a vehicle, comprising: adjusting a speed of a compressor in response to a user requested temperature; generating an estimate of a super heating temperature of a refrigerant according to a pressure at an inlet side of a compressor and a temperature at the inlet side of the compressor; reducing the speed of the compressor to a reduced speed in response to the super heating temperature of the refrigerant being greater than a superheating threshold temperature; generating the estimate of the super heating temperature of the refrigerant according to the pressure at the inlet side of the compressor and the temperature at the inlet side of the compressor; and deactivating the compressor in response to the compressor being at the reduced speed and the estimate of the super heating temperature of the refrigerant exceeding the super heating threshold temperature. In a first example, the method includes where deactivating the compressor includes reducing the speed of the compressor to zero. In a second example that may include the first example, the method further comprises providing an indication of loss of refrigerant in response to the super heating temperature of the refrigerant exceeding the super heating threshold temperature. In a third example that may include one or both of the first and second examples, the method further comprises cooling a battery and a passenger cabin of the vehicle via the cooling system while generating the estimate of the super heating temperature of the refrigerant. In a fourth example that may include one or more of the first through third examples, the method includes where the battery is a traction battery.

As will be appreciated by one of ordinary skill in the art, methods described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other system hardware.

This concludes the description. The reading of it by those skilled in the art would bring to mind many alterations and modifications without departing from the spirit and the scope of the description. For example, the systems and methods described herein may be applied to full electric vehicles and vehicles that include an engine and an electric motor for propulsion.

The invention claimed is:

1. A method for operating a cooling system of a vehicle, comprising:
   reducing a speed of a compressor to operate the compressor at below a threshold speed;
   while operating the compressor below the threshold speed, generating an estimate of a super heating temperature of a refrigerant according to a pressure at an inlet side of the compressor and a temperature at the inlet side of the compressor; and
   deactivating the compressor in response to the estimate of the super heating temperature of the refrigerant exceeding a super heating threshold temperature while operating the compressor below the threshold speed.

2. The method of claim 1, where the compressor is deactivated when the estimate of the super heating temperature of the refrigerant exceeds the super heating threshold temperature for a predetermined amount of time, the predetermined amount of time measured by incrementing a counter responsive to the super heating temperature of the refrigerant exceeding the super heating threshold temperature while the compressor is being operated below the threshold speed.

3. The method of claim 2, where the super heating threshold temperature is based on ambient temperature and the speed of the compressor.

4. The method of claim 3, where the super heating temperature is a present temperature of the refrigerant minus a boiling temperature of the refrigerant in a liquid state.

5. The method of claim 1, where the estimate of the super heating temperature is determined without data of a pressure downstream of the compressor and upstream of an expansion valve.

6. The method of claim 1, where the temperature and pressure sensors are downstream of a chiller and upstream of the compressor.

7. The method of claim 1, further comprising commanding the compressor to an adjusted speed based on a temperature difference.

8. The method of claim 7, where the temperature difference is a difference between a requested passenger cabin temperature and measured passenger cabin temperature.

9. A method for operating a cooling system of a vehicle, comprising:
   adjusting a speed of a compressor to operate the compressor at a reduced speed in response to a user requested temperature, where the reduced speed is less than a threshold speed;
   while operating the compressor at the reduced speed, generating an estimate of a super heating temperature of a refrigerant according to a pressure at an inlet side of the compressor and a temperature at the inlet side of the compressor;
   holding the speed of the compressor at the reduced speed in response to the super heating temperature of the refrigerant being greater than a super heating threshold temperature; and then
   deactivating the compressor in response to the compressor being at the reduced speed and the estimate of the super heating temperature of the refrigerant exceeding the super heating threshold temperature for greater than a predetermined period of time.

10. The method of claim 9, where deactivating the compressor includes reducing the speed of the compressor to zero.

11. The method of claim 10, further comprising providing an indication of loss of refrigerant in response to the super heating temperature of the refrigerant exceeding the super heating threshold temperature.

12. The method of claim 11, further comprising cooling a battery and a passenger cabin of the vehicle via the cooling system while generating the estimate of the super heating temperature of the refrigerant.

13. The method of claim 12, where the battery is a traction battery.

14. The method of claim 2, further comprising:
   while operating the compressor at above the threshold speed, determining the super heating temperature is less than the super heating threshold temperature; and

decrementing the counter responsive to the super heating temperature being less than the super heating threshold temperature while operating the compressor at above the threshold speed.

\*    \*    \*    \*    \*